(12) United States Patent
Gersabeck et al.

(10) Patent No.: US 8,406,938 B2
(45) Date of Patent: Mar. 26, 2013

(54) REMOTE OPERATOR ASSISTANCE FOR ONE OR MORE USER COMMANDS IN A VEHICLE

(75) Inventors: David Marvin Gersabeck, Commerce Township, MI (US); LaTaunya LaShea Blanks, Belleville, MI (US); Ninos Ziazadeh, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/111,436

(22) Filed: May 19, 2011

(65) Prior Publication Data
US 2012/0296494 A1 Nov. 22, 2012

(51) Int. Cl.
G06F 7/00 (2006.01)
(52) U.S. Cl. .......................................................... 701/2
(58) Field of Classification Search ................ 701/2, 22, 701/24, 36, 400, 410, 412
See application file for complete search history.

(56) References Cited

U.S. PATENT DOCUMENTS

| | | | |
|---|---|---|---|
| 6,028,537 A * | 2/2000 | Suman et al. | 340/988 |
| 6,278,772 B1 | 8/2001 | Bowater et al. | |
| 6,385,535 B2 | 5/2002 | Ohishi et al. | |
| 6,411,899 B2 | 6/2002 | Dussell | |
| 6,459,969 B1 | 10/2002 | Bates et al. | |
| 6,505,780 B1 | 1/2003 | Yassin et al. | |
| 6,600,975 B2 | 7/2003 | Moriguchi et al. | |
| 6,993,490 B2 | 1/2006 | Chen et al. | |
| 7,120,928 B2 | 10/2006 | Sheth et al. | |
| 7,139,722 B2 | 11/2006 | Perrella et al. | |
| 7,142,664 B2 | 11/2006 | Seligmann | |
| 7,145,998 B1 | 12/2006 | Holder et al. | |
| 7,283,813 B2 | 10/2007 | Hamanaga et al. | |
| 7,346,630 B2 | 3/2008 | Eichstaedt et al. | |
| 7,376,226 B2 | 5/2008 | Holder et al. | |
| 7,433,714 B2 | 10/2008 | Howard et al. | |

(Continued)

FOREIGN PATENT DOCUMENTS

| | | |
|---|---|---|
| JP | 2007205872 A | 8/2007 |
| JP | 2008172820 A | 7/2008 |

(Continued)

OTHER PUBLICATIONS

Ford Motor Company, "SYNC with Navigation System," Owner's Guide Supplement, SYNC System Version 1 (Jul. 2007).

(Continued)

*Primary Examiner* — Kim T Nguyen
(74) *Attorney, Agent, or Firm* — Jennifer M. Stec; Brooks Kushman P.C.

(57) ABSTRACT

Various embodiments relate to remote operator assistance for one or more user commands at a vehicle. The operator assistance may occur via a vehicle computing system. One or more instances of an unsuccessful attempt to perform a user command may be received by the vehicle computing system. After detection of a predetermined number of instances, a connection may be established, via the vehicle computing system, with a remotely located system. The remotely-located system may be operated by a human operator in order to assist with performance of the user command. An information exchange may be facilitated between the vehicle and the remotely located system operated by the human operator. The information exchange may relate to the user command. The user command may be performed in the vehicle based on information obtained from the remotely-located system.

10 Claims, 4 Drawing Sheets

U.S. PATENT DOCUMENTS

| | | |
|---|---|---|
| 7,444,384 B2 | 10/2008 | Horvitz |
| 7,469,827 B2 | 12/2008 | Katragadda et al. |
| 7,474,264 B2 | 1/2009 | Bolduc et al. |
| 7,586,956 B1 | 9/2009 | Mishra et al. |
| 7,813,950 B2 | 10/2010 | Perrolla et al. |
| 7,889,096 B2 | 2/2011 | Breed |
| 2002/0107032 A1 | 8/2002 | Agness et al. |
| 2004/0073643 A1 | 4/2004 | Hayes et al. |
| 2004/0192270 A1 | 9/2004 | Kreitzer |
| 2004/0220768 A1 | 11/2004 | Klein |
| 2005/0019228 A1 | 1/2005 | Myers et al. |
| 2005/0088284 A1 | 4/2005 | Zai et al. |
| 2006/0058948 A1 | 3/2006 | Blass et al. |
| 2006/0290490 A1 | 12/2006 | Kraus et al. |
| 2007/0042812 A1 | 2/2007 | Basir |
| 2007/0120948 A1 | 5/2007 | Fujioka et al. |
| 2007/0285256 A1 | 12/2007 | Batra |
| 2008/0057927 A1 | 3/2008 | Han |
| 2008/0086455 A1 | 4/2008 | Meisels et al. |
| 2008/0319653 A1 | 12/2008 | Moshfeghi |
| 2008/0319665 A1 | 12/2008 | Berkobin et al. |
| 2009/0005966 A1 | 1/2009 | McGray et al. |
| 2009/0075624 A1 | 3/2009 | Cox et al. |
| 2009/0111422 A1 | 4/2009 | Bremer et al. |
| 2009/0144622 A1 | 6/2009 | Evans et al. |
| 2009/0248285 A1 | 10/2009 | Bauer |
| 2009/0267757 A1 | 10/2009 | Nguyen |
| 2009/0312901 A1 | 12/2009 | Miller et al. |
| 2010/0062714 A1 | 3/2010 | Ozaki |
| 2010/0136944 A1 | 6/2010 | Taylor et al. |
| 2010/0148920 A1 | 6/2010 | Philmon et al. |
| 2010/0227629 A1 | 9/2010 | Cook et al. |
| 2010/0228803 A1 | 9/2010 | Quinn |
| 2010/0233957 A1 | 9/2010 | Dobosz |
| 2010/0274689 A1 | 10/2010 | Hammad et al. |
| 2010/0274865 A1 | 10/2010 | Frazier et al. |
| 2010/0287024 A1 | 11/2010 | Ward et al. |
| 2011/0021234 A1 | 1/2011 | Tibbitts et al. |
| 2011/0039581 A1 | 2/2011 | Cai et al. |
| 2011/0045810 A1 | 2/2011 | Issa et al. |
| 2011/0137520 A1 | 6/2011 | Rector et al. |
| 2011/0137773 A1 | 6/2011 | Davis, III et al. |
| 2011/0176670 A1 | 7/2011 | Kaplan et al. |
| 2011/0298924 A1 | 12/2011 | Miller et al. |
| 2011/0300843 A1 | 12/2011 | Miller et al. |
| 2011/0300884 A1 | 12/2011 | Ollila et al. |
| 2012/0010805 A1 | 1/2012 | Wilkerson |
| 2012/0158658 A1 | 6/2012 | Wilkerson |
| 2012/0172009 A1 | 7/2012 | Wilkerson |

FOREIGN PATENT DOCUMENTS

| | | |
|---|---|---|
| WO | 03107129 A2 | 12/2003 |
| WO | 2011016886 A2 | 2/2011 |

OTHER PUBLICATIONS

Ford Motor Company, "SYNC," Owner's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

Kermit Whitfield, "A hitchhiker's guide to the telematics ecosystem", Automotive Design & Production, Oct 2003, http://findarticles.com, pp. 1-3.

AppManiax, Inc. "PhonePlus Callback". http://www.handango.com/catalog/ProductDetails.jsp?productId=254405&platformId=80.

Christoph Hammerschmidt, Melexis, The Sky's The Limit, Continental NXP to integrate NFC into cars, Feb. 17, 2011, http://automotive-eetimes.com/en/continental-nxp-to-integrate-nfc-into-cars.html?cmp_id=.

Blackberry, Blackberry Curve Series Blackberry Curve 9300/9330 Smartphones, User Guide Version 6:0, www.blackberry.com/docs/smartphones.

jNetX Call Reminder for BlackBerry. Feb. 17, 2009. Retrieved from: http://www.pocketberry.com/2009/02/17/jnetx-call-reminder-for-blackberry/.

\* cited by examiner

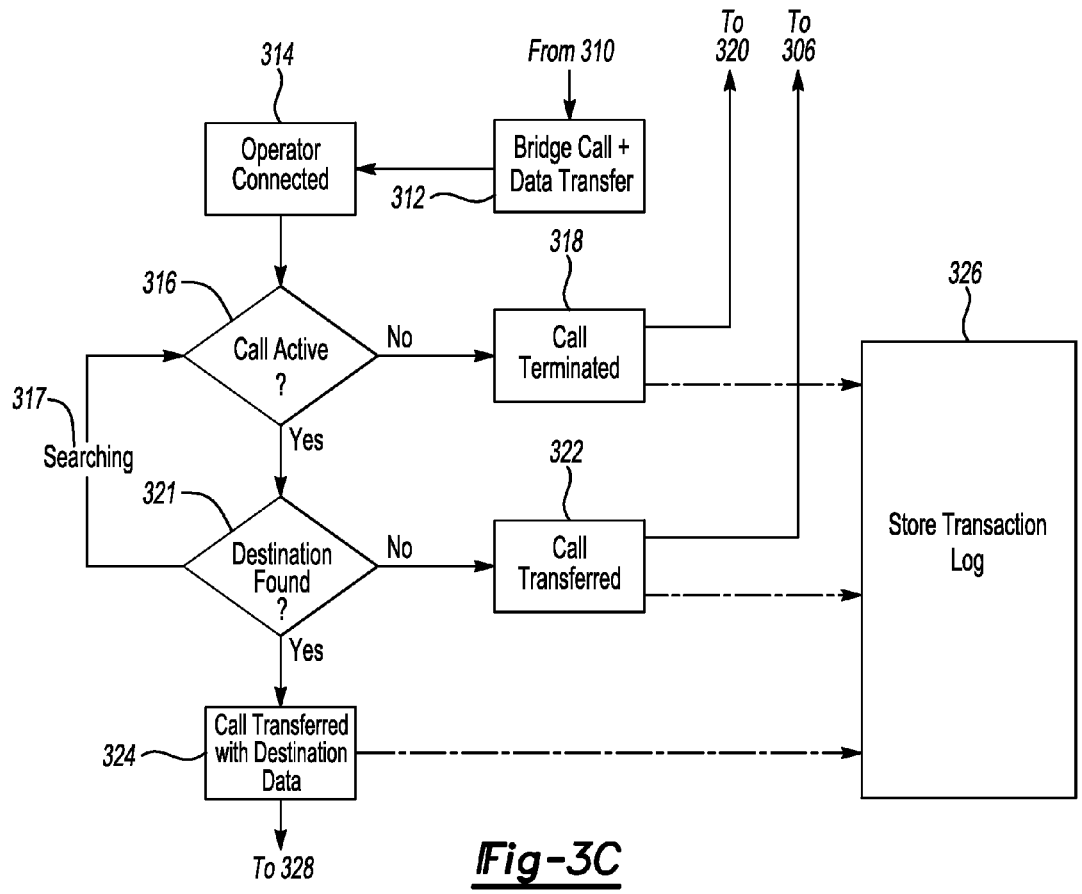
Fig-3C
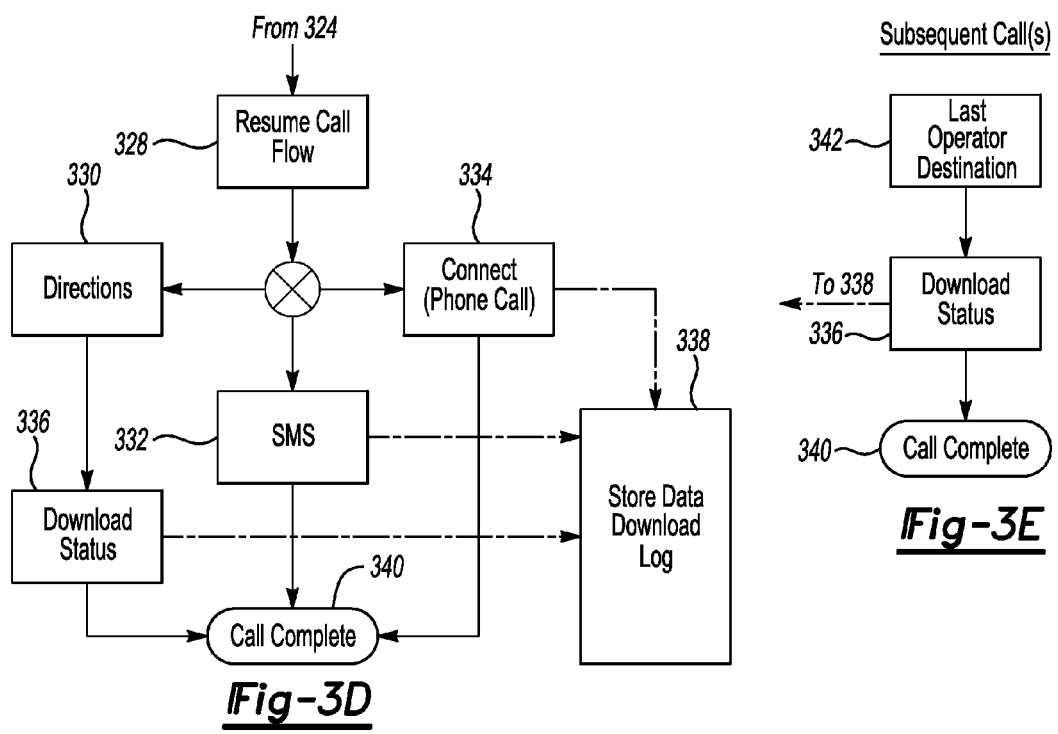
Fig-3D
Fig-3E

REMOTE OPERATOR ASSISTANCE FOR ONE OR MORE USER COMMANDS IN A VEHICLE

TECHNICAL FIELD

Various embodiments relate to using a vehicle-based computer to perform one or more vehicle-based operations. In some embodiments, an operator located remotely from the vehicle is used for completing, or providing information to complete, the vehicle-based operations when the vehicle-based computer has difficulty recognizing commands from a vehicle occupant and/or performing the vehicle-based operation.

BACKGROUND

Nowadays, it is not uncommon for a vehicle to have an onboard system for enabling in-vehicle telematics services. These systems typically include a live operator with whom the vehicle occupant connects in order to receive one or more vehicle-based services. A vehicle occupant pushes a button in the vehicle which establishes a connection with the live operator via, for example, a phone call.

One such example of a system is disclosed in U.S. Publication No. 2008/0319665 to Berkobin et al. The Berkobin publication discloses methods, systems, and apparatuses for aftermarket telematics. An apparatus comprises a telematics control unit configured for consumer installation, consumer use, and the like. The apparatus can be installed in a vehicle. Additionally, systems and methods enable operation of the apparatus.

Another example is disclosed in U.S. Pat. No. 6,028,537 to Suman et al. The '537 Patent discloses a vehicle communication and control system. The system includes a transceiver for sending and receiving RF signals, a processor coupled to the transceiver, a location identifying sensor for supplying vehicle location data, a user interface for providing information to a user and for enabling a user to input commands to be executed by the processor, and a vehicle accessory interface for coupling the processor to a vehicle accessory control circuit to enable the processor to issue commands to a vehicle accessory. The processor is adapted to perform a wide variety of functions in response to user input commands, received RF signals, and other commands received from other vehicle accessories and components coupled to the system through the vehicle system bus. Some of these functions include establishing a two-way communication link, requesting and providing location-specific information, enabling remote tracking of the vehicle, issuing an emergency request or a request for roadside assistance, requesting and receiving navigational information, remote control of vehicle functions, enabling remote diagnostics of the vehicle, and enabling reprogramming of various vehicle accessories and components.

Some systems, however, such as SYNC from THE FORD MOTOR COMPANY, are complete connectivity and communication systems using embedded modules and a nomadic device for operation.

SUMMARY

One aspect includes a system for providing remote assistance in a vehicle. The system may include at least one computer associated with a vehicle which may be configured to detect one or more instances of an unsuccessful attempt to perform a user command which may be made at the vehicle.

In some embodiments, the user commands may be a navigation command such as a destination search. The at least one computer may be further configured to establish a connection with a remotely located system after detection of a predetermined number of instances. This remotely located system may be operated by a human operator to assist with performance of the user command.

The at least one computer may be configured to facilitate an information exchange between the vehicle and the remotely located system that may be operated by the human operator. The information exchange may relate to the user command. In some embodiments, the information exchange may include voice communication.

The at least one computer may be configured to perform the user command based on information obtained from the remotely-located system.

In some embodiments, the system may include a command processing system. The command processing system may be in communication with the remotely located system and the at least one computer associated with the vehicle. The command processing system may be configured to receive the information from the remotely-located system and transmit the information to the at least one computer associated with the vehicle so that the user command may be performed at the vehicle.

In some embodiments, the connection may be established automatically once the predetermined number instances has been exceeded.

In some embodiments, the at least one computer may be configured to receive a user request to connect to the remotely-located system. Further, the at least one computer may be configured to establish the connection to the system in response to the user request.

In some embodiments, the at least one computer may be configured to receive eligibility information defining an eligibility to connect to the system. The connection may be established based on the eligibility information. The eligibility information may limit a number of connections that may be made to the operator. The limitations may be based on at least one of frequency, time, and cost. The eligibility may be determined for a user or a vehicle.

In some embodiments, the user command may be a spoken command. Further, the unsuccessful attempt may be due to a failure by a speech recognition system to recognize the spoken command.

Another aspect may include a method for providing remote assistance in a vehicle. The method may include receiving a navigation command at a computer which may be associated with a vehicle. The method may also include detecting at the computer at least one unsuccessful attempt to perform the navigation command.

After detecting the unsuccessful attempt, a connection may be established to a remotely-located system. The remotely-located system may be operated by a human operator. The connection may be used to facilitate an information exchange between the vehicle and the remotely-located system operated by the human operator. The information exchange may relate to the navigation command.

The method may also include receiving information from the remotely-located system as a result of the information exchange. Based on this information, it may be determined that the navigation command can be performed. The method may also include performing the navigation command at the computer.

In some embodiments, the method may include monitoring a number of unsuccessful attempts at the computer. The connection may be established after the number of unsuccessful attempts is equal to or greater than a predefined number of unsuccessful attempts.\

In some embodiments, the at least one unsuccessful attempt may be transmitted from the vehicle computer to the system during the information exchange. Further, information about the unsuccessful attempt may include an audio recording of the at least one unsuccessful attempt.

In some embodiments, the information received as a result of the information exchange includes navigation information to perform the navigation command.

Another aspect may include a method which may include detecting one or more instances of a user command which may be unsuccessfully performed by a vehicle computer. The method may also include establishing a connection to a remotely-located system. The remotely-located system may have a human operator. The connection may facilitate an information exchange between a vehicle and the system relating to the user command. The method may also include performing the command at the computer based on information obtained as a result of the information exchange.

These and other aspects will be better understood in view of the attached drawings and the following detailed description.

BRIEF DESCRIPTION OF THE DRAWINGS

The figures identified below are illustrative of some embodiments of the invention. The figures are not intended to be limiting of the invention recited in the appended claims. The embodiments, both as to their organization and manner of operation, together with further object and advantages thereof, may best be understood with reference to the following description, taken in connection with the accompanying drawings, in which:

FIGS. 3A, 3B, 3C, 3D, and 3E illustrate the operation of the live operator backup system according to one of the various embodiments.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Additionally, the disclosure and arrangement of the figures is non-limiting. Accordingly, the disclosure and arrangement of the figures may be modified or re-arranged to best fit a particular implementation of the various embodiments of the invention.

Occasionally, in-vehicle navigation systems, whether onboard or portable, fail to find a destination requested by a vehicle occupant. For example, the navigation system may fail to find a particular address and/or a particular point of interest (POI). Consequently, the user of the navigation system may be forced to search for an alternative destination point within the vicinity of the ultimate destination. For example, the user may search for a nearby address, a cross street, or a nearby POI. In some cases, the user may be forced to stop driving and get directions. In any case, the user must still then find a way to the ultimate destination based on whatever information is given. At least one consequence of this is that the driver may still get lost and, in turn, cause anxiety, frustration, and wasted time.

Using a live operator can offer various conveniences to a vehicle occupant. For example, since the live operator may have access to various tools that enable the requested services to be retrieved and provided in the vehicle, a live operator may be able to more readily perform a service, and/or identify information, requested, but unable to be performed and/or identified, through the vehicle's onboard computer.

Figure 1:
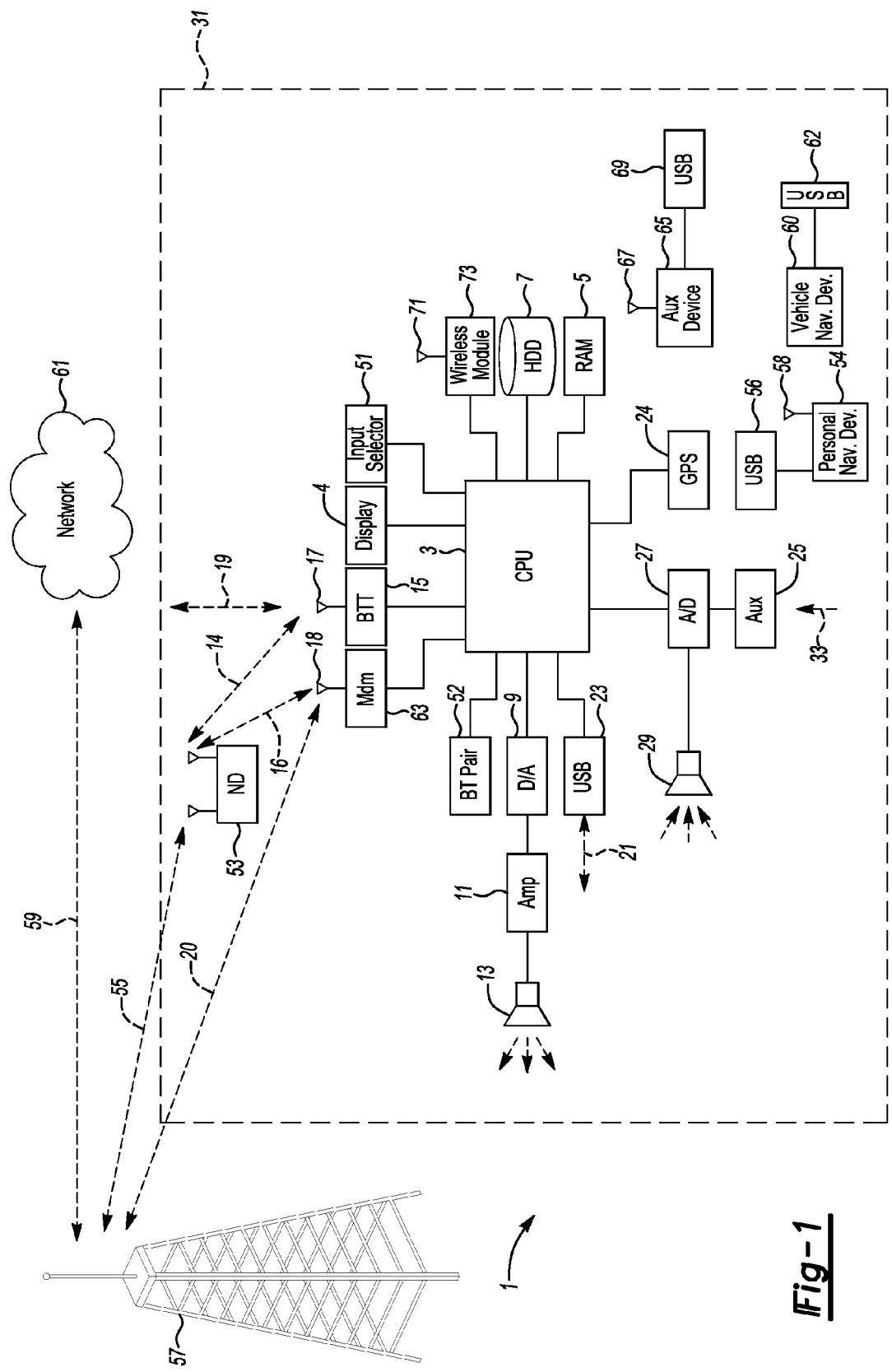
FIG. 1 illustrates a block topology of a vehicle associated computing system according to one of the various embodiments.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device).

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example).

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

While the various processes and services provided by the VCS 1 are accomplished without the use of a live operator, in some instances, a live operator may be desired. As a non-limiting example, if a particular destination cannot be identified through the navigation system 54, 60, the live operator may be desired to locate the requested destination. As another example, if one or more speech directed actions are not being performed by the VCS 1, it may be that the speech cannot be recognized by the VCS 1. As another non-limiting example, if a connection to a computer of system 100 cannot be established, a communication connection cannot be established, and/or a connection is slow, the live operator may be connected. As such, a live operator may be desired in order to complete, or at least initiate, the requested operation. Certainly, a live operator may be desired in other instances in which the VCS 1 (or a component of the VCS 1) cannot complete a requested task provided from a vehicle occupant (e.g., and without limitation diagnostics information, or a business search for communication with the business). For purposes of brevity, the various embodiments will be described with respect to tasks performed by the navigation system 54 or 60.

In some embodiments, a vehicle user may connect to the live operator when outside of the vehicle. For example, if a search for a destination cannot be found using, for example, a mapping application executing on the ND 53, a call may be placed to the live operator to find the destination. If the destination is found, the live operator may transmit a text message (or other electronic communication, such as an email) including the destination information for receipt by the vehicle user at the ND 53. In some embodiments, from a mobile application executing on the ND 53, instructions to complete the search may be sent to the live operator (in addition to or as an alternative to placing a call).

Figure 2:
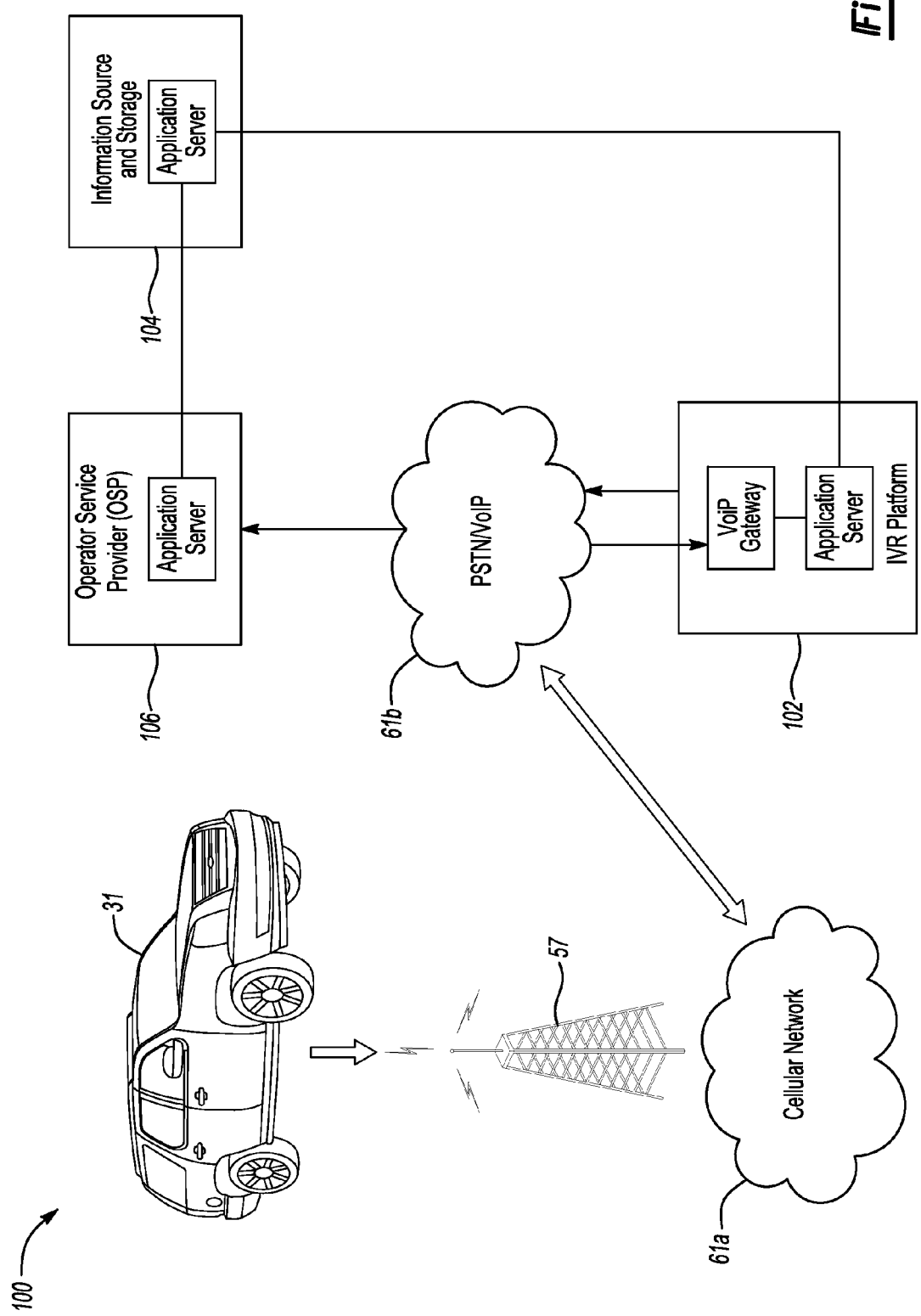
FIG. 2 illustrates a block topology of a system remote from a vehicle through which a live operator connects to and communicates data with the system of FIG. 1.

Referring now to FIG. 2, communicating with the VCS 1 in the vehicle 31 may be a remote system 100 of one or more computers. In some embodiments, the one or more computers may be configured with one or more software modules for accomplishing one or more operations according to the various embodiments as disclosed. Further, the VCS 1, may have stored in memory one or more API's or software applications having instructions for performing one or more operations.

Additionally or alternatively, the VCS 1 may have programmed circuitry for performing one or more operations.

From the vehicle 31, data, such as a voice and/or touch-based command from a vehicle occupant, may be communicated to the one or more computers via network 61*a*, which, in some embodiments, may be a cellular network and, in additional or alternative embodiments, the Internet. Further, the data may be transmitted from the network 61*a* to communication network 61*b* which may be a public service telephone network (PSTN), the Internet and/or a voice-over-IP network (VoIP). It will be appreciated that networks 61*a* and 61*b* correspond to network 61 of FIG. 1 and are illustrated in FIG. 1 as a single network for purposes of illustration and clarity. However, it is possible that network 61 may be (or be comprised of) multiple proprietary and/or non-proprietary networks without departing from the scope of the invention.

One or more computers 102 may receive one or more commands from the vehicle occupant(s) via the VCS 1 for processing and/or performing the one or more commands. In some embodiments, computer(s) 102 may be an interactive voice recognition (IVR) computer 102 that may provide speech recognition and/or speech synthesis for voice command(s) received from a vehicle occupant in the vehicle 31. For example, a vehicle occupant may speak a navigation command (e.g., destination address, POI, etc.) which may be received by the microphone 29 and transmitted, via network 61, to the IVR computer 102. To enable the exchange of voice commands between computer 102 and other components of the system 100, the computer 102 may include a gateway application (e.g., software) for communication over network 61*b*. The gateway application may enable communication using VoIP, PSTN, cellular, or other like communication tools.

In alternative embodiments, the VCS 1 may store in memory (or be programmed with) software instructions for speech recognition/synthesis. In yet alternative embodiments, the VCS 1 may store in memory (or be programmed with) software instructions for speech recognition and the IVR computer 102 may provide speech synthesis (or vice-versa). For purposes of brevity, the operation of system 100 will be described with respect to the embodiment illustrated in FIG. 2.

The one or more computers 102 may be a primary processing point for processing commands from the vehicle occupant(s). If the commands cannot be processed nor information identified and/or retrieved based on the commands, an operator service provider (OSP) 108 may be contacted in order to provide the unidentified information (for completion of the request by the computer 102) and/or complete the request from the vehicle occupant(s). While illustrated in FIG. 2 as a single terminal, computer 102 may be plurality of networked computers.

Accordingly, the operator service provider (OSP) 108 may process speech commands that are unsuccessfully processed by the computer 102 to fulfill the requested operation from the vehicle occupant(s). The OSP may be a live, human operator having access to one or more tools for processing the request. These tools may include a combination of a communication network (e.g., the Internet or a LAN), one or more computers, database(s) and data searching tools. As one non-limiting example, the live operator may search for a particular destination address from a database of addresses. Other processing tools may be used according to the particular implementation of the invention.

Computer 104 may be an information source for status information about the transaction between the VCS 1 and the system 100. The status information may include connection status information between VCS 1 and one or more components of the system 100. As non-limiting examples, the connection status information may include a duration of connection to the live operator and whether a connection to the OSP 108 was (e.g., successful) or was not (e.g., failed) established.

In some embodiments, eligibility of a vehicle occupant to use the OSP 108 may be based on one or more factors. These factors may include, but are not limited to, one or more of time (e.g., subscription based), frequency (e.g., a number of connections to the OSP 108), and cost. In some embodiments, the cost may be based on a predetermined cost value based on, for example, a pre-payment such as a deposit of a certain value for using the OSP 108. As the OSP 108 is used, the deposit value may be correspondingly decremented until it is used up (and needs to be refreshed). The deposit value may be in any currency or, in some embodiments, in the form of credits. The cost may additionally or alternatively be based on a total number of uses during a period of time.

Accordingly, the computer 104 may store and/or provide information about vehicle occupant usage of the system 100. The computer 104 may store usage information as profile information which may include one or more of vehicle identification information (e.g., a vehicle identification number (VIN)) and occupant identification information (e.g., name and/or a phone number). Thus, the usage information may be associated with the vehicle occupant(s) and/or the vehicle 31. In addition to eligibility information, usage information stored in computer 104 may also include statistical information about the usage of the system 100.

Figure 3A:
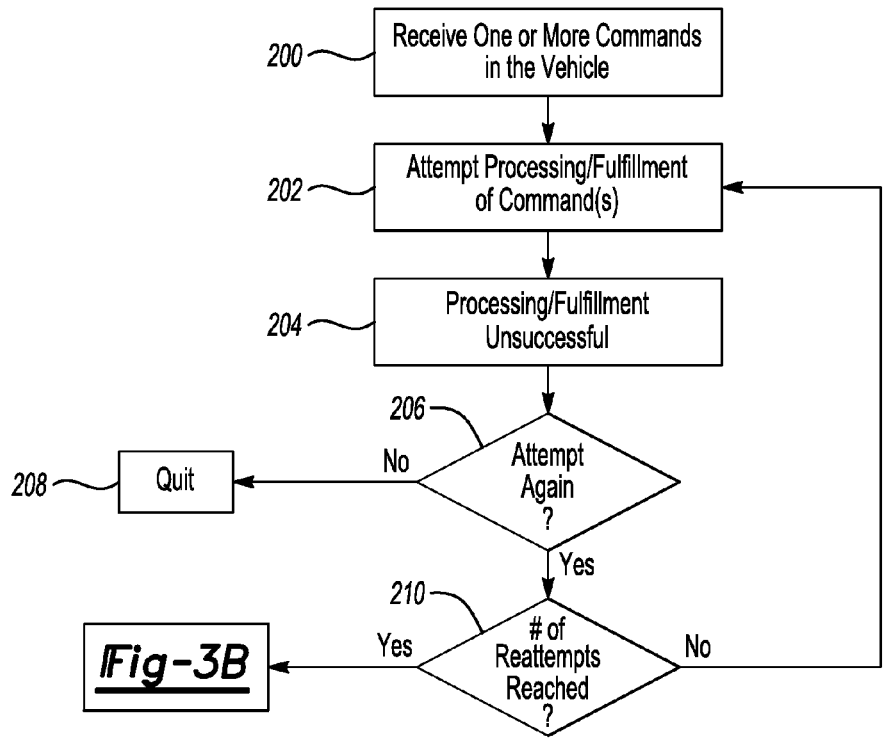

FIGS. 3A-3E illustrate the operation of using a live operator as a backup for fulfilling, or providing information for fulfilling, requested services by a vehicle occupant from the VCS 1. Referring to FIG. 3A, a command for one or more vehicle-based services may be received at the VCS 1 (block 200). As a non-limiting example, the command may be for a destination search by the navigation system 54 or 60 such as an address search or a POI search. While there are other examples of commands that may be received at the VCS 1, for brevity, FIGS. 3A-3E will be described in the context of a destination search.

The VCS 1 may attempt to process and/or fulfill the received voice command(s) (block 202) locally (e.g., using software stored in memory of the VCS 1) and/or remotely at computer 102. However, the attempts at processing and/or fulfillment of the command(s) may be unsuccessful (block 204) causing a live operator to be connected to the vehicle occupant to provide information for fulfilling the request, as described below.

The VCS 1 may be unsuccessful at processing and/or performing a command from the vehicle occupant(s) because the voice command cannot be recognized based on a threshold confidence level defined for voice recognition. A confidence level may be a confidence of the voice recognition system that a spoken utterance matches one or more items in a database of voice recognition terms or phrases (also referred to as "grammars"). The computer 102 may be programmed to recognize a particular utterance when the confidence level is equal to above a defined threshold level. When the confidence level is below a particular threshold, use of the live operator may be activated.

In some embodiments, recognition of a command may be based on user feedback. At some threshold confidence levels (as a non-limiting example, above 90% confidence), user feedback may not be required to execute a verbal command because the command may have a match in the stored grammars. In this case, the matching grammar may not be output for confirmation. At some threshold confidence levels, however, the user may confirm the match. Accordingly, if the matching grammar cannot be confirmed and/or a match not found, the use of the live operator may be activated.

The confirmation may be implicit or explicit. Implicit confirmation may include the system outputting the matching grammar and executing the command if the user does not provide feedback as to the propriety of the matching grammar. An explicit confirmation may include outputting the matching grammar and requiring an explicit confirmation of the matching grammar before it is executed. In some embodiments, an implicit confirmation may be needed when the confidence level is, for example, between 75% and 90%. An explicit confirmation may be required when the confidence level is, for example, between 50% and 75%. Below 50% confidence level, a match may not be detected. Certainly, the confidence values are provided for illustration and other values may be used without departing from the scope of the invention.

Additionally or alternatively, a command may not be performed by the VCS 1 because the subject of the vehicle-based service that is requested by the occupant(s) (e.g., and without limitation, a destination) cannot be found or identified. The VCS 1 may search for the item from data storage (e.g., an address or POI from a database storing navigation data such as maps, routes, and the like) which may be stored on a computer networked to system 100. The particular item requested may not be found or identified from the search.

When the attempt to perform the command(s) is unsuccessful at least one time, the VCS 1 may attempt to perform the command(s) again (block 206). The vehicle occupant(s) may receive a notification in the vehicle that the attempt was unsuccessful and that an attempt will be made again to perform the command(s).

The notification may include an option for selection by the vehicle occupant(s) to cease additional attempts. Accordingly, an occupant may choose to quit further attempts by the VCS 1 to perform the command(s) (block 208). Alternatively or additionally, the VCS 1 may quit further attempts if, for example, a predetermined number of attempts (predefined and programmed to the VCS 1) has already been met and the vehicle occupant does not connect to the OSP 106. In this case, a message or notification may be presented to the vehicle occupant requesting whether a connection to the OSP is desired so that the command(s) may be performed.

The occupant may select the option for the VCS 1 to attempt to perform the command(s) again or, alternatively, the VCS 1 may automatically reattempt to perform the command(s) (as programmed to the VCS 1) (block 206). The VCS 1 may be limited in the number of attempts that may be performed. For example, the VCS 1 may be limited to three attempts. Certainly, the number of attempts is non-limiting and any value may be used as desired in the specific implementation of the invention.

Therefore, in the attempt(s) subsequent to the original attempt, a determination may be made if a limit defined for the reattempts has been reached (block 210). If the number of reattempts is less than the predefined number of reattempts, the VCS 1 may reattempt to process and/or fulfill the command(s) (block 202). Otherwise, a connection to the OSP 106 may be automatically established to perform the command(s) when the number of reattempts equals the maximum predetermined number of reattempts. In some embodiments, a connection to the OSP 106 may be made to perform the command(s) when the number of reattempts is greater than the maximum predetermined number of reattempts. Further details of the process for establishing a connection to the OSP 106, and the operations performed when the OSP 106 is connected, will be described with the remaining figures.

In some embodiments, when the number of reattempts equals the maximum predetermined number of attempts, a notification may be presented to the vehicle occupant whether a connection to the OSP 106 is desired. Accordingly, the vehicle occupant may or may not choose to connect to the OSP 106. If a connection is not made, the VCS 1 may quit from further attempts (block 208). Alternatively, the occupant may seek the assistance of the OSP and, therefore, a connection to the OSP 106 may be established for further processing of the command(s) in response to the occupant's selection to establish a connection. In some embodiments, a vehicle occupant may establish a preference to automatically connect to the OSP 106 based on the number of reattempts. Thus, in this case, such notifications may not be presented to the vehicle occupant.

Figure 3B:
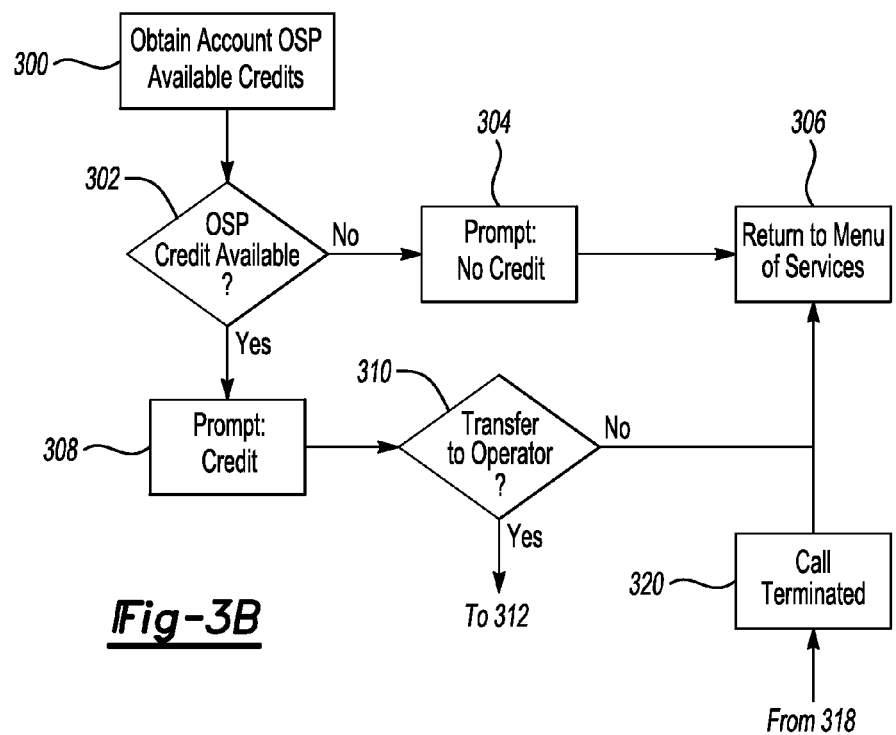

Referring now to FIGS. 3B-3E, the process for establishing a connection to the OSP 106 and the operation for performing the command(s) using the assistance of the OSP 106 is described. As described above, the eligibility for establishing a connection to the OSP 106 may be based on one or more factors, such as, and without limitation, cost. FIG. 3B illustrates the process using cost as a factor. It will be appreciated, however, that the use of eligibility factors is but one embodiment of the various embodiments and other embodiments may not necessarily use such factors.

The cost may be determined based on a credit value representing the number of connections to OSP 106 that may be established. The number of credits associated with the vehicle occupant and/or the vehicle may be obtained from computer 104 (block 300) and a check made to determine if there are available credits (block 302). If no credits are available, a connection may not be established with the OSP 106 (block 304). In some embodiments, the vehicle occupant may be presented with a message that no credits remain and/or to obtain additional credits. A non-limiting example of such a message may be, upon a failure by the VCS 1 to recognize and/or process a command, "I'm sorry, I still didn't get that. Please visit <website> to purchase additional operator transactions. Now returning to the Services menu." Accordingly, the VCS 1 may return to a service menu (block 304).

However, a check of the available number of credits (block 302) may indicate that there are credits available for an operator transaction (block 308). When credits are available and a command is not recognized or not performed by the VCS 1, the following non-limiting message may be presented to the vehicle occupant: "I'm sorry, I still didn't get that. I see that your account has <credit> available for operator transactions. Would you like me to connect to an operator?" For clarity, the operation is described in this context. However, as described above, a connection to the OSP 106 may be established automatically as an alternative to asking the occupant if a connection is desired. In this case, a notification may or may not be presented. If presented, the message may inform the occupant, for example, that a connection to the OSP 106 is being established.

If the occupant does not seek the assistance of the OSP 106 (block 310), the VCS 1 may return to a menu of services (block 306) for presentation to the vehicle occupant. In this case, because the OSP 106 has not been used, the occupant's number of credits may not be decremented.

Otherwise, referring now to FIG. 3C, a call to the OSP 106 may be bridged and data transferred (block 312) to the OSP 106. Non-limiting examples of data that may be transferred to the OSP 106 may include information about the occupant (e.g., identification information, locality and/or information about the type of request), audio data including a recording of the failed attempts, and GPS location. A live operator at the OSP 106 may then be connected to the occupant via the VCS 1 (block 314).

At any time during a connection that is active (block 316), the occupant or the OSP 106 may terminate the connection (block 318). In some embodiments, communication with the IVR computer may also be temporarily terminated (e.g., until a new service is requested by the occupant from the VCS 1) (block 320).

During the active connection with the OSP 106 (block 316), a search 317 may be performed (using the information sources available to the OSP 106) for the item that is the subject of the occupant's command. As illustrated in FIG. 3C, a non-limiting example of such an item may be a destination (block 321). The information sources available the OSP 106 may include proprietary systems (e.g., proprietary to the OSP 106) and non-proprietary systems (e.g., and without limitation, third-party commercial search engines and software programs).

The OSP 106 may not identify the requested item (e.g., the destination). As such, the occupant may be informed that the item could not be found and the connection terminated between the VCS 1 and the OSP 106. In some embodiments, a connection between the VCS 1 and the computer 102 may be re-established (e.g., via transfer of connections from the OSP 106 to the computer 102, such as shown in block 322). A data look up status may also be transferred (e.g., a failure to find the destination). The VCS 1 may display a menu of services (block 306) after the connection with the OSP 106 has been released. In such a case, the credits available to the occupant may not be decremented based on use because further information could not be obtained by the operator 106 to fulfill the request from the vehicle occupant.

If the destination is found (block 321), the connection may be transferred to the computer 102, along with the data obtained by the OSP 106, so that such data may be processed by the computer 102 for output at the VCS 1 (block 324). Accordingly, in some embodiments, a credit may be decremented from the occupant's available credits as a result of the find. The data searched and obtained by the OSP 106 may be data used to complete any missing parameters from the original request via the VCS 1 from the occupant. Additional data that may be transferred may include, but is not limited to, information about the occupant (e.g., identification information and/or locality), a data look up status (e.g., destination successfully identified), and, in some cases, GPS information about the destination.

In some embodiments, a transaction log may be created for each connection (block 326). The transaction log may be stored in computer 104 and associated with the occupant in the vehicle 31 requesting operator assistance (e.g., stored in an occupant profile). Additionally or alternatively, the log may be associated with the vehicle (e.g., stored in a vehicle profile). The transaction log may record information including, but not limited to, connection status (e.g., success/failure), call duration, and the like.

Referring now to FIG. 3D, when the data to perform the operation requested by the vehicle occupant is obtained by the OSP 106, computer 102 may receive the data and continue communication with the VCS 1 (block 328). From the computer 102, the data may be transmitted to the VCS 1 and/or the ND 53 (via the VCS 1) such that the result(s) of the occupant command may be received by the vehicle occupant at one or both devices. As a non-limiting example, if the requested operation by the occupant was a destination search, the results may be output as directions to and/or contact information for the destination (e.g., a phone number). The directions may be output to the navigation 54 or 60 (block 330) and/or as a text message on the ND 53 (block 332). Alternatively or additionally, the occupant may call the destination via ND 53 (block 334).

In some embodiments, status information about the data download may be logged (block 336) and stored in computer 104 (block 338). The logged information about the data download may be in addition to the transaction data also stored on computer 104 (as described above).

Interaction with computer 102 and/or OSP 106 may be complete once the data is downloaded to the VCS 1 and/or the ND 53 (block 340).

In some embodiments, as represented in FIG. 3E, the user may recall the last destination retrieved by the live operator (block 342). In this case, if a destination consistently cannot be found, the user may have the option to retrieve the last destination identified by the live operator (without connecting to the live operator). In some embodiments, a predetermined number (e.g., greater than one) of previously identified destinations may be retrieved. The information may be downloaded for execution in the vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
detect an unsuccessful user command issued at the vehicle;
after detecting a predetermined number of unsuccessful commands, establish a connection with a remote system operated by a human operator to assist with command implementation;
facilitate information exchange between the vehicle and the remotely located system, relating to the user command; and
implement the user command based on information obtained from the remotely-located system.

2. The system of claim 1 further comprising a command processing system in communication with the remote system and the processor, the command processing system configured to:
receive the information from the remote system; and
transmit the information to the at least one computer associated with the vehicle so that the user command may be performed at the vehicle.

3. The system of claim 1 wherein the connection is established automatically once the predetermined number has been exceeded.

4. The system of claim 1 wherein the processor is further configured to:
receive a user request to connect to the remote system; and
establish the connection to the remote system in response to the user request.

5. The system of claim 1 wherein the processor is further configured to:
receive eligibility information defining an eligibility to connect to the remote system; and
establish the connection based on the eligibility information.

6. The system of claim 5 wherein the eligibility information limits a number of connection made based on at least one of frequency, time, and cost.

7. The system of claim 5 wherein the processor is further configured to:
- receive identifying information identifying a user or the vehicle;
- identify the user or the vehicle based on the identifying information; and
- determine eligibility for the identified user or the identified vehicle.

8. The system of claim 1 wherein the user command is a spoken command and the unsuccessful attempt is due to a failure by a speech recognition system to recognize the spoken command.

9. The system of claim 1 wherein the information exchange includes voice communication.

10. A method comprising:
- detecting an instance of an unsuccessful user command implementation attempt by a vehicle computer;
- establishing a connection to a remotely-located system having a human operator to facilitate an information exchange between a vehicle and the system relating to the user command; and
- implementing the command at the vehicle computer based on information obtained from the remotely-located system as a result of the information exchange.

* * * * *